(No Model.)

M. NORDEN.
SIGNAL FOR CABLE RAILROADS.

No. 568,205. Patented Sept. 22, 1896.

WITNESSES:
John A. Rennie
Chas. H. Smith

INVENTOR
Mortimer Norden
BY
L. W. Serrell & Son
ATTORNEYS.

UNITED STATES PATENT OFFICE.

MORTIMER NORDEN, OF NEW YORK, N. Y., ASSIGNOR TO MINER & CO., OF SAME PLACE.

SIGNAL FOR CABLE-RAILROADS.

SPECIFICATION forming part of Letters Patent No. 568,205, dated September 22, 1896.

Application filed June 29, 1893. Serial No. 597,269. (No model.)

*To all whom it may concern:*

Be it known that I, MORTIMER NORDEN, a citizen of the United States, residing at New York, in the county and State of New York, have invented a new and useful Improvement in Signals for Cable-Railroads, of which the following is a specification.

In connection with cable-railways watchers are employed to inspect the cable as the same passes out of the power-house into the trench in the street, and it is a difficult matter for one employed in the capacity of watcher to so inspect the moving cable as to readily detect the broken strands, which may probably cause mischief in the trench by coming in contact with the grip.

The object of the present invention is to provide a device electrically actuated which shall instantly detect any and all broken strands, so that the cable may be arrested and the broken strands repaired.

In carrying out my invention I employ a sleeve, preferably of metal, surrounding and considerably larger than the cable and suitably supported between the usual guiding-rollers between which the cable runs. Passing through this sleeve are radially-placed wires, that are inclined within the sleeve in the direction of the moving cable, the same forming inclined spring-tongues with the points close to but not touching the cable. These wires are located at various places in and around the sleeve, and the sleeve is connected with one wire of an electric circuit, and the cable is connected with the other wire of the electric circuit, and I prefer to place in said circuit a battery and a relay and to provide a local circuit and battery, a switch, and a call-bell.

In the operation of the device any broken strand of the moving cable comes in contact with one or more of the inclined spring-tongues and completes the main circuit, drawing over the armature of the relay, so that the local circuit is completed, causing the bell to ring, giving immediate notice that a broken strand has been discovered, so that the cable can be stopped to repair the damage. In the local circuit I prefer to place a switch and to remove the usual retractile spring from the armature of the relay, so that the local circuit remains intact and the bell keeps ringing until the circuit is broken by the operation of the switch and the return by hand of the relay-armature to its normal position.

Figure 1:
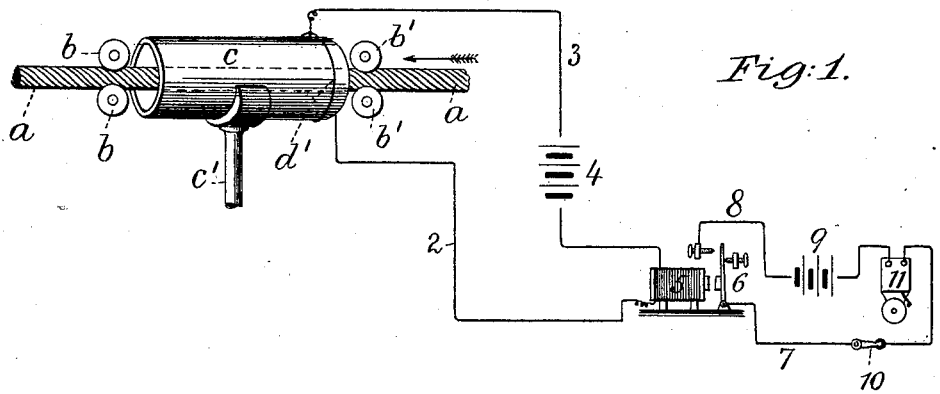
Figure 2:
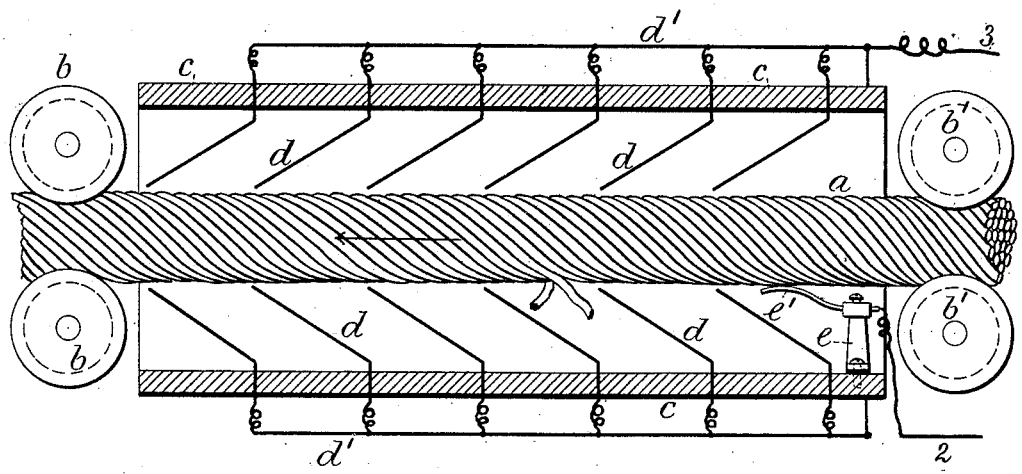
Figure 3:
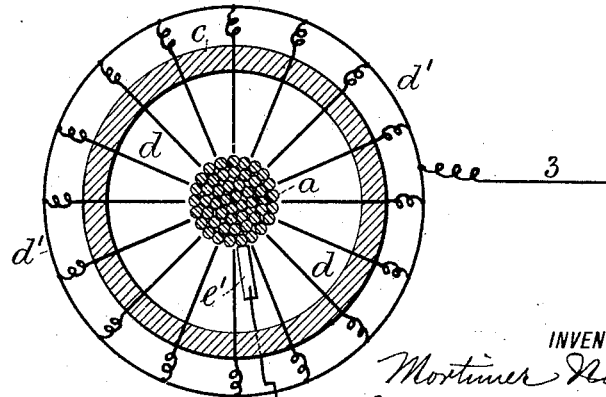

In the drawings, Figure 1 represents a diagrammatic view illustrative of my invention. Fig. 2 is a longitudinal section of the surrounding sleeve and adjacent parts, and Fig. 3 is a cross-section of the sleeve shown in Fig. 2.

The cable is represented at $a$, and the pairs of grooved guide-wheels at $b\ b'$. The sleeve surrounding the cable between the pairs of guide-wheels is represented at $c$, and the same is supported by a standard $c'$ or in any other desired manner. Wires $d$ pass at numerous places through the sleeve and are radial and terminate as inclined spring-tongues, the inclination being in the direction of the moving cable, and the points of said tongues approach close to the cable, but do not touch the same when in perfect condition. I have shown these wires as connected together outside of the sleeve by the wires $d'$, the same in turn being connected to one of the wires 3 of the main circuit, and I have shown the other wire 2 of the main circuit as connected to an insulated post $e$ within the metal sleeve, and from said post extends a spring-blade $e'$, that bears at all times upon the surface of the cable.

In the main circuit I have shown the battery 4 and the relay-magnet 5, and in the local circuit connected to said relay I have included the armature 6, wires 7 8, the battery 9, the switch 10, and the call-bell 11. The device would be equally effective if the sleeve $c$ were of metal and the wire 3 of the main circuit were connected directly thereto.

In the operation of the device the cable runs through the sleeve freely and centrally, as guided by the pairs of rollers $b\ b'$, without making any contact with the spring-tongues $d$. In case there is a broken strand the same comes in contact with one or more of said spring-tongues and instantly completes the main electric circuit, and by the relay-magnet moves the armature 6 and closes the local circuit and rings the bell 11 to give the alarm to the one in charge, so that the machinery moving the cable can be stopped to repair the broken strand.

I prefer to dispense with the usual retractile spring of the relay, so that the armature thereof remains in contact with the front stop and maintains the local circuit closed, so that the alarm-bell keeps ringing until the switch 10 is opened or the armature of the electro-magnet is moved back by hand and the parts returned to their normal positions, ready to be operated by any other broken stand of the cable.

I claim as my invention—

1. The combination with the traveling cable and supports for maintaining it in position, of numerous conductors surrounding such cable with their ends closely adjacent but not touching such cable, electric circuit connections from said conductors and an alarm brought into action by a broken strand or projection from the cable, substantially as specified.

2. The combination with a cable and rollers for guiding the same, of a sleeve around and larger than the cable, numerous conductors passing through said sleeve and whose points are inclined in the direction of the moving cable to form spring-tongues with the points close to but not touching the cable and with electric circuit connections for giving an alarm to indicate a broken strand in the cable, substantially as set forth.

3. The combination with the cable and the rollers for guiding the same, of a metal sleeve around and larger than the cable, numerous conductors within said metal sleeve placed radially, with their ends inclined in the direction of the moving cable to form spring-tongues whose points approach close to the cable but do not touch, and electric circuit connections with the metal sleeve and cable respectively for giving an alarm by closing the circuit by a broken strand coming in contact with the spring-tongues within the metal sleeve, substantially as set forth.

4. The combination with the cable and the pairs of guide-rollers therefor, of a metal sleeve around and larger than the cable, numerous conductors extending through said metal sleeve and placed radially, with their ends inclined in the direction of the moving cable to form spring-tongues whose points approach close to the cable but do not touch, and a main circuit comprising a wire 3 from the metal sleeve and a wire 2 in contact with the cable, a battery 4 and relay 5 and a local circuit in which is an alarm-bell, the same being operated by a broken strand of the cable coming in contact with one or more of said spring-tongues, substantially as set forth.

5. The combination with the cable and the pairs of guide-rollers therefor, of a metal sleeve around and larger than the cable, numerous conductors extending through said metal sleeve and placed radially, with their ends inclined in the direction of the moving cable to form spring-tongues whose points approach close to the cable but do not touch, and a main circuit comprising a wire 3 from the metal sleeve, a battery 4, a relay 5, a wire 2, an insulated standard $e$ connected with the metal sleeve and a spring-tongue $e'$ and a local circuit from the relay-armature 6 comprising wires 7, 8, a battery 9, a switch 10, and an alarm-bell 11, the parts operating substantially in the manner and for the purposes set forth.

Signed by me this 23d day of June, A. D. 1896.

MORTIMER NORDEN.

Witnesses:
GEO. T. PINCKNEY,
HAROLD SERRELL.